United States Patent [19]

Takahashi

[11] Patent Number: 5,732,109

[45] Date of Patent: Mar. 24, 1998

[54] PHASE DETECTOR

[75] Inventor: Hidehiro Takahashi, Yokohama, Japan

[73] Assignee: Kabushiki Kaisha Toshiba, Kawasaki, Japan

[21] Appl. No.: 549,811

[22] PCT Filed: Jun. 7, 1994

[86] PCT No.: PCT/JP94/00915

§ 371 Date: Dec. 7, 1995

§ 102(e) Date: Dec. 7, 1995

[87] PCT Pub. No.: WO94/29991

PCT Pub. Date: Dec. 22, 1994

[30] Foreign Application Priority Data

Jun. 7, 1993 [JP] Japan .................... 5-135807

[51] Int. Cl.$^6$ .................... H04L 27/14; H04L 27/16
[52] U.S. Cl. .................... 375/326; 375/373; 375/375; 327/7; 327/163; 327/236; 327/244; 331/25
[58] Field of Search .................... 375/371, 373, 375/375, 376, 324, 326, 327, 362; 327/3, 7, 231, 233, 236, 40, 107, 154–159, 241, 237, 243, 244, 254–255, 163; 331/11, 1 R, 25

[56] References Cited

U.S. PATENT DOCUMENTS

| 4,253,184 | 2/1981 | Gitlin et al. | 375/235 |
|---|---|---|---|
| 4,599,732 | 7/1986 | LeFever | 375/231 |
| 5,109,394 | 4/1992 | Hjerpe et al. | 375/376 |
| 5,315,618 | 5/1994 | Yoshida | 375/340 |
| 5,386,239 | 1/1995 | Wang et al. | 375/261 |
| 5,400,366 | 3/1995 | Iwamatsu | 375/344 |
| 5,491,729 | 2/1996 | Co et al. | 375/376 |

FOREIGN PATENT DOCUMENTS 60-229558  11/1985  Japan .
2-20154   1/1990  Japan .

*Primary Examiner*—Don N. Vo
*Attorney, Agent, or Firm*—Banner & Witcoff, Ltd.

[57] ABSTRACT

Disclosed is a phase detection apparatus for accurately calculating the phase of an input digital complex baseband signal point independently of its amplitude value, without requiring any large-capacity arc-tangent table memory and within a practical calculation time. This phase detection apparatus rotates the phase of the input signal point in a clockwise direction and determines whether the rotated signal point agrees with a reference phase point. If the rotated signal point leads the reference phase point, the signal point is further rotated by an angle onehalf of the predetermined angle. If the rotated signal point lags behind the reference phase point, the signal point before the rotation is rotated by a half angle of the predetermined angle. Rotational angles, 180°, 90°, 45°, . . . , for the individual rotations are stored in a table. If the rotated signal point agrees with the reference phase point after the rotation processing is performed several times, or, even if the two points do not agree, if all of the rotational angles stored in the table are used in the rotation processing, the sum of the angles rotated so far is output as the phase of the input signal.

43 Claims, 7 Drawing Sheets

| ADDRESS | SIN DATA | COS DATA | ROTATIONAL ANGLE (°) |
|---|---|---|---|
| 1 | 0.0 | −1.0 | 180 |
| 2 | 1.0 | 0.0 | 90 |
| 3 | 0.707 | 0.707 | 45 |
| 4 | 0.383 | 0.923 | 22.5 |
| 5 | 0.196 | 0.981 | 11.3 |
| 6 | 0.098 | 0.995 | 5.6 |
| 7 | 0.049 | 0.999 | 2.8 |
| 8 | 0.024 | 1.0 | 1.4 |

| ADDRESS | SIN DATA | COS DATA | ROTATIONAL ANGLE |
|---|---|---|---|
| 1 | 1.0 | 0.0 | 90 |
| 2 | 0.707 | 0.707 | 45 |
| 3 | 0.383 | 0.923 | 22.5 |
| 4 | 0.196 | 0.981 | 11.3 |
| 5 | 0.098 | 0.995 | 5.6 |
| 6 | 0.049 | 0.999 | 2.8 |
| 7 | 0.024 | 1.0 | 1.4 |

PHASE DETECTOR

TECHNICAL FIELD

The present invention relates to a phase detection apparatus used to detect the phase of a received signal in a carrier wave reproduction circuit for synchronous detection, a phase detection circuit, or a frequency detection circuit provided in, e.g., a digital mobile radio communication apparatus or a satellite communication apparatus.

BACKGROUND ART

Recently, with the development of semiconductor technologies, particularly digital IC technologies, a digital demodulation circuit is in many instances realized by a digital signal processing circuit in a radio communication apparatus for use in a digital cellular radio communication system or a satellite communication system. In a digital demodulation circuit of this type, a quadrature detector detects, e.g., a received radio signal and converts the signal into a complex baseband signal. An A/D converter converts this complex baseband signal into a digital complex baseband signal. A digital signal processing circuit performs synchronous detection, phase detection, or frequency detection for this digital complex baseband signal.

To realize the digital demodulation function as described above, it is necessary to detect the phase from the received complex baseband signal. The following various apparatuses have been developed as conventional phase detection apparatuses for performing this phase detection.

(1) A phase is the arc tangent ($\tan^{-1}$ (Q/I)) of a real-part component I and an imaginary-part component Q of a digital complex baseband signal. Accordingly, calculate the arc tangents of combinations of various I and Q values in advance, and prepare a table in a ROM. Input I and Q as addresses to the ROM, and output a phase corresponding to these input addresses from the table.

(2) Instead of calculating arc tangents in advance, calculate them by means of series expansion.

(3) Regard the value of the imaginary-part component Q as a phase.

(4) Calculate Q×sign(I), and regard the calculated value as a phase. Note that sign(X) is +1 when the sign of X is positive, and −1 when the sign is negative.

(5) Calculate Q×sign(I)−I×sign(Q), and regard the calculated value as a phase.

These conventional phase detection apparatuses have the following problems.

That is, system (1) using a table ROM requires a large-capacity ROM. This increases the circuit scale of the apparatus, leading to the difficulty in decreasing the size and weight of the apparatus. This degrades the portability of mobile communication apparatuses such as portable telephone sets whose most important objectives are a small size and a light weight. Therefore, system (1) is very undesirable in these apparatuses.

In system (2), calculations must be repetitively done a large number of times. Since this prolongs the calculation time, system (2) is unsuitable for real-time processing of communication apparatuses.

Systems (3) to (5) have the advantage that only relatively simple calculations need to be performed in these systems. However, these systems can detect only the polarity of the phase or the magnitude of the signal level, i.e., cannot detect the phase itself. In particular, because of variations in the calculation results these systems cannot calculate an accurate phase from a signal, such as a received signal modulated by a π/4 shift DQPSK system, which changes its amplitude level in accordance with the phase position.

The present invention has been made in consideration of the above situation and has its object to provide a phase detection apparatus which requires no large-capacity memory and can calculate an accurate phase, within a practical calculation time, independently of the amplitude value of an input signal.

It is another object of the present invention to provide a phase detection apparatus suited for use in mobile communication apparatuses.

DISCLOSURE OF INVENTION

To achieve the above objects, a phase detection apparatus of the present invention comprises phase rotating means for rotating a phase of an input signal point, rotational angle setting means for supplying a plurality of rotational angles in decreasing order to the phase rotating means, phase comparing means for determining whether the signal point rotated by the phase rotating means agrees with a reference phase point within a predetermined error range, control means for sequentially rotating the phase of the input signal point by the plurality of rotational angles, until the phase comparing means detects the agreement, or, even if the phase comparing means does not detect the agreement, until the rotational angle setting means supplies all of the plurality of rotational angles to the phase rotating means. The control mans output data indicating the phase of the input signal point based on a sum of the phase rotational angles.

As a consequence, the phase detection apparatus of the present invention can perform phase detection without using any large-capacity memory. Accordingly, the circuit scale can be decreased compared to the case where an arc-tangent ROM is used. This makes it possible to realize reductions in the size and weight of, e.g., a mobile radio communication apparatus.

Also, since the phase rotation is done in decreasing order of angle, the phase of an input signal can be made agree with the reference phase by a relatively small number of repetition times. This obviates the need for a large number of repetitive calculations, making phase detection in short time periods feasible.

Furthermore, the detection system is independent of the amplitude value of an input signal. Consequently, accurate phase detection can be performed even in processing a signal, such as a received signal modulated by a π/4 shift DQPSK system, which changes its amplitude level in accordance with the phase position.

BEST MODE OF CARRYING OUT THE INVENTION

To describe the present invention in more detail, its embodiments will be described below with reference to the accompanying drawings.

Figure 1:
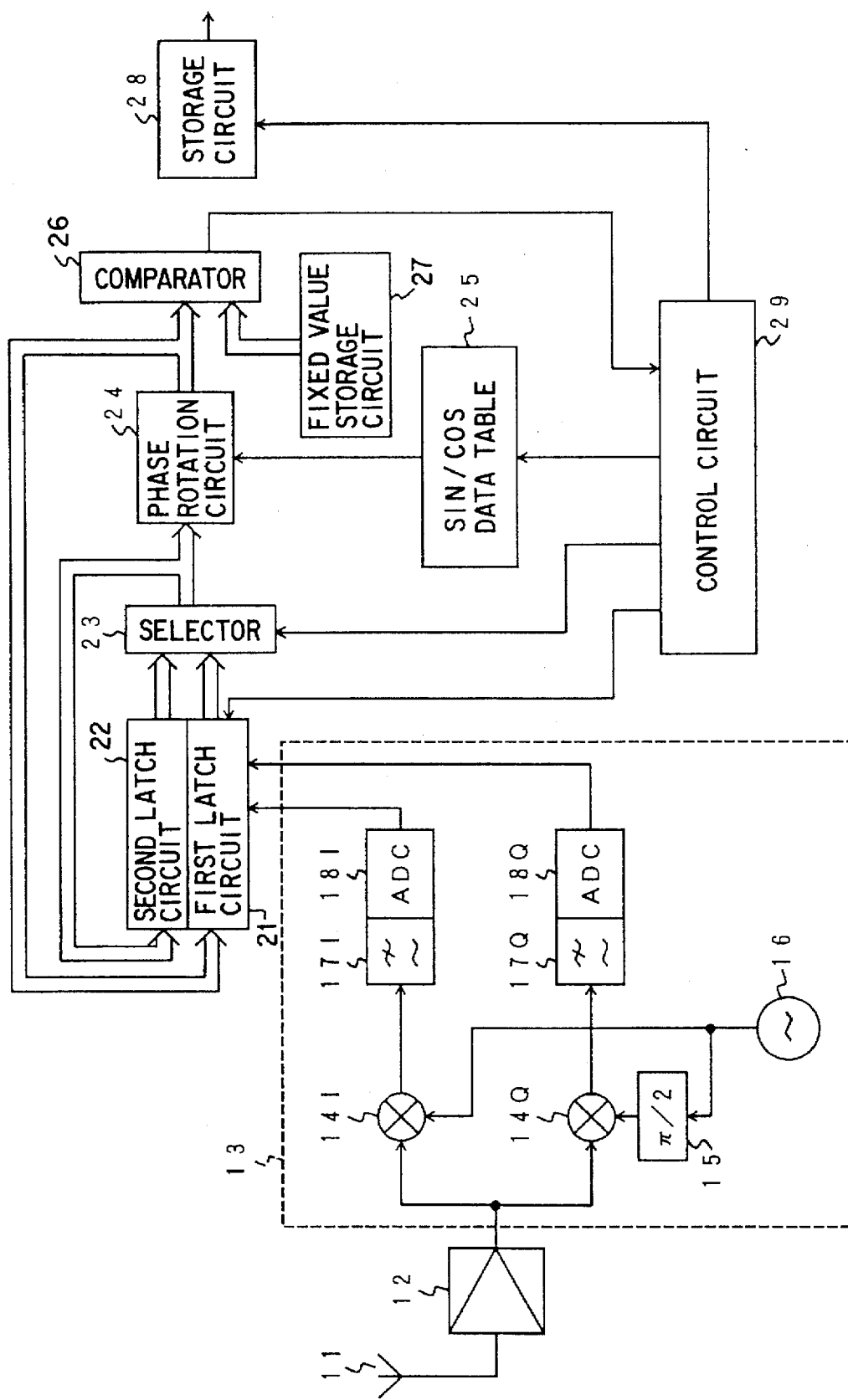
FIG. 1 is a block diagram showing the configuration of a receiving system of a mobile radio communication apparatus which includes a phase detection apparatus according to the first embodiment of the present invention.

FIG. 1 is a block diagram showing the configuration of a receiving system of a mobile radio communication apparatus which includes a phase detection apparatus according to the first embodiment of the present invention.

Referring to FIG. 1, a radio frequency signal coming from a base station (not shown) is received by an antenna 11, amplified by a low-noise amplifier 12, and applied to a quadrature detection circuit 13. In the quadrature detection circuit 13, the received radio frequency signal is first divided into two signal components and applied to mixers 14I and 14Q. The mixers 14I and 14Q mix the respective signal components with reception local oscillation signals having a $\pi/2$ phase difference. Consequently, these signal components are frequency-converted into a real-part (I) component and an imaginary-part (Q) component of a complex baseband signal. A local oscillation signal generated by a frequency synthesizer 16 is directly supplied to the mixer 14I and supplied to the mixer 14Q via a $\pi/2$ phase shifter 15. The output I and Q components of the received complex baseband signal from the mixers 14I and 14Q are filtered by baseband filters (low-pass filters) 17I and 17Q and applied to A/D converters (ADCs) 18I and 18Q. The A/D converters 18I and 18Q convert the input signals into digital signals and transfer them to the phase detection apparatus.

The phase detection apparatus comprises a first latch circuit 21 and a second latch circuit 22 for receiving the digital complex baseband signals (I and Q components), a selector 23 for selecting one of outputs from the first and second latch circuits 21 and 22 and also supplying the output to the second latch circuit 22, a phase rotation circuit 24 for rotating the phase of the output signal from the selector 23 and also supplying the output to the first latch circuit, a sin/cos data table 25 for giving phase rotational angle information to the phase rotation circuit 24, a fixed value storage circuit 27, a comparator 26 for comparing the phase of the output signal from the phase rotation circuit 24 with the output from the fixed value storage circuit 27, a storage circuit 28 for storing the output from the comparator 26, and a control circuit 29. Note that in the block diagram of the phase detection apparatus, the I and Q components of the digital complex baseband signal are together indicated by thick lines.

The A/D converters 18I and 18Q output the digital complex baseband signals (a unit of the digital signal periodically output from the A/D converter will be referred to as a sample hereinafter) at a predetermined period corresponding to a sampling clock, and the phase of each sample is detected. Before the sample phase detection operation is started, the first latch circuit 21 holds the output digital complex baseband signals from the A/D converters 18I and 18Q. After the phase detection operation is started, the first latch circuit 21 holds the output phase-rotated digital complex baseband signal from the phase rotation circuit 24. On the other hand, the second latch circuit 22 holds the digital complex baseband signal before phase rotation, which is supplied to the phase rotation circuit 24, each time the phase rotation circuit 24 performs phase rotation. The signal holding and reading operations by these first and second latch circuits 21 and 22 are done in accordance with instructions from the control circuit 29.

The selector 23 which consists of, e.g., a multiplexer alternatively selects the phase-rotated complex baseband signal held by the first latch circuit 21 and the complex baseband signal before phase rotation held by the second latch circuit 22, in accordance with instructions from the control circuit 29, and supplies the selected signal to the phase rotation circuit 24.

The phase rotation circuit 24 rotates the phase of the complex baseband signal supplied from the selector 23 by an angle corresponding to sin data and cos data supplied from the sin/cos data table 25. The phase rotation circuit 24 outputs the resulting phase-rotated complex baseband signal.

Assuming the input to the phase rotation circuit 24 is I+jQ, a signal I'+jQ' after the rotation is represented by $$I'=I\cdot\cos\theta-Q\cdot\sin\theta$$

$$Q'=Q\cdot\cos\theta+I\cdot\sin\theta$$

where $\theta$ is positive in the clockwise direction.

Figures 2, 4:
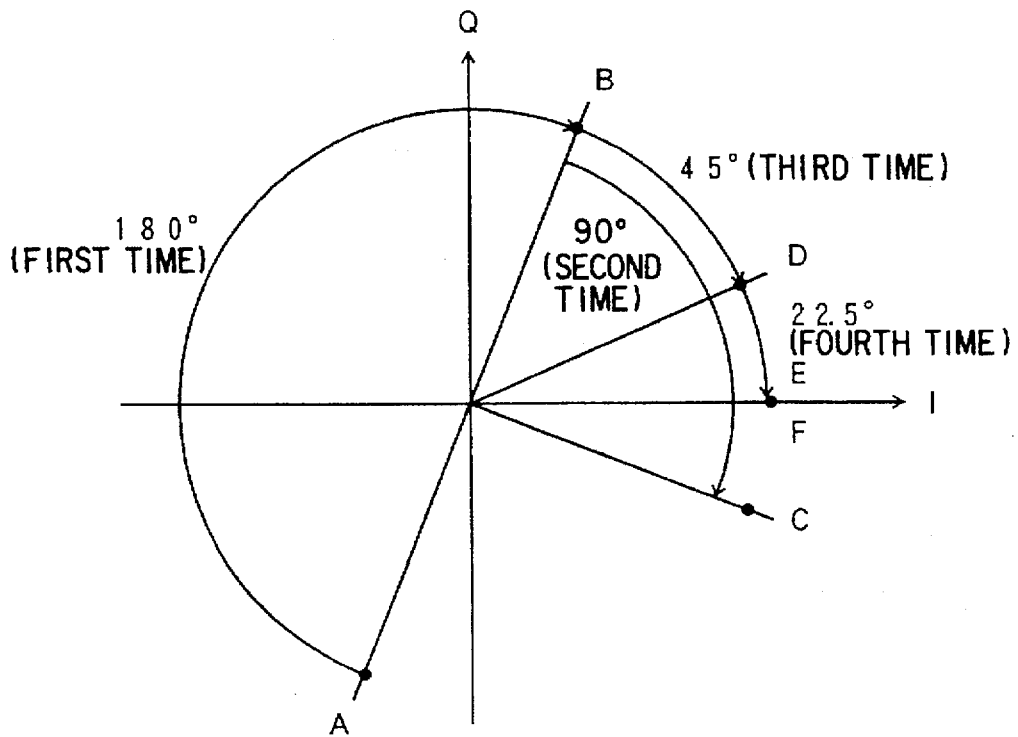
FIG. 2 is a view showing an example of a sin/cos data table illustrated in FIG. 1.
FIG. 4 is a view showing the way of phase rotation to explain the operation of the first embodiment.

The sin/cos data table 25 comprises a ROM in which, as illustrated in FIG. 2, sin data and cos data representing a rotational angle of $360°/2^n$ (n=1 to 8), that is, eight rotational angles of 180°, 90°, 45°, 22.5°, 11.3°, 5.6°, 2.8°, and 1.4°, are stored in a one-to-one correspondence with addresses 1 to 8. These sin and cos data are selectively read out in accordance with an address supplied from the control circuit 29. Note that the rotating direction of the phase rotation circuit 24 is fixed in the clockwise direction.

The comparator 26 compares the phase of the output phase-rotated complex baseband signal from the phase rotation circuit 24 with the reference phase previously stored in the fixed value storage circuit 27, thereby determining whether the phase of the complex baseband signal leads, lags behind, or agrees with the reference phase signal. The comparator 26 outputs a signal of level "1" if it determines that the phase of the signal leads the reference phase, a signal of level "−1" if it determines that the phase of the signal lags behind the reference signal, and a signal of level "0" if it determines that the phase of the signal agrees with the reference phase. These determination signals are input to the control circuit 29. Note that 0°, for example, is used as the reference phase. In this determination by the comparator 29, the determination of whether the phase of the complex baseband signal agrees with the reference phase need not be done by determining whether the phase of the signal completely agrees with the reference phase. That is, the agreement can be determined if the phase of the signal falls within a certain allowable error range with respect to the reference signal.

The control circuit 29 controls the whole phase detection operation done by the individual circuits described above. That is, in accordance with the output determination signal from the comparator 26, the control circuit 29 controls the selector 23 to selectively supply the complex baseband signals held in the first and second latch circuits 21 and 22. Also, in synchronism with this control the control circuit 29 reads out the sin and cos data, which represent the phase rotational angle, in decreasing order of angle from the sin/cos data table 25, and supplies the readout data to the phase rotation circuit 24, thereby making the phase rotation circuit 24 rotate the phase of the complex baseband signal. Furthermore, the control circuit 29 writes a value corresponding to the determination result from the comparator 26 into the storage circuit 28. The storage circuit 28 comprises, e.g., a RAM.

The operation of the phase detection apparatus with the above arrangement will be described below with reference to the flow chart of the control circuit 29 shown in FIG. 3. The gist of the operation of the present invention is as follows. That is, when the sample signal point of a digital complex baseband signal is supplied, the control circuit 29 rotates the sample point on a phase plane in sequence by the individual rotational angles registered in the table shown in FIG. 2 while determining whether the phase of each rotated signal point agrees with the reference phase. If the agreement is detected, the control circuit 29 detects the sum of the angles rotated so far as the phase angle of the sample point.

When the operation is started, initialization is performed as in step #10, i.e., 0 is set in a parameter i which represents the number of rotations.

When the A/D converters 18I and 18Q output digital complex baseband signals of one sample, in step #12, the first latch circuit 21 latches the data of one sample point.

In step #14, the selector 23 is controlled to select the first latch circuit 21, and the sample point of the output digital complex baseband signal from the quadrature detection circuit 13, which is held in the first latch circuit 21, is supplied to the phase rotation circuit 24.

In step #16, the control circuit 29 increments the parameter i by 1.

In step #18, the control circuit 29 supplies the parameter i as an address to the sin/cos data table 25, reads out sin data and cos data stored in that address, and supplies the readout data to the phase rotation circuit 24. That is, the control circuit 29 first designates address 1 and reads out sin data and cos data corresponding to the largest phase rotational angle, i.e., 180°.

In step #20, the phase rotation circuit 24 performs a phase shift operation by which the sample point of the digital complex baseband signal, which is supplied via the selector 23 and held in the first latch circuit 21, is rotated clockwise.

In step #22, the control circuit 29 causes the first latch circuit 21 to latch the data of the rotated sample point and the second latch circuit 22 to latch the data of the sample point before the rotation.

In step #24, the control circuit 29 determines whether the parameter 1 has reached 8. If YES in step #24, the control circuit 29 terminates the operation since the phase rotation circuit 24 has completed the rotation processing for all of the rotational angles stored in the sin/cos data table 25. If NO in step #24, in step #26 the comparator 26 determines whether the phase of the rotated signal point agrees with a fixed value corresponding to the reference phase stored in the fixed value storage circuit 27. If YES in step #26, the control circuit 29 stores "1" in the storage circuit 28 in step #28 and ends the operation.

If NO in step #26, in step #30 the control circuit 29 determines whether the phase of the rotated signal point leads the reference phase (the phase of the rotated signal point is present before the reference point in the counterclockwise direction). If YES in step #30, "1" is stored in the storage circuit 28 in step #32. In step #34, the selector 23 is controlled to select the first latch circuit 21 for the next rotation processing, and the rotated phase is supplied to the phase rotation circuit 24. Thereafter, the flow returns to step #16 to repeat the above operation by incrementing the parameter i by 1. That is, the phase of the rotated signal point is further rotated by a half of the immediately preceding rotational angle. If the phase of the rotated signal point lags behind the reference phase, "0" is stored in the storage circuit 28 in step #36. In step #38, the selector 23 is controlled to select the second latch circuit 22 for the next rotation processing, and the phase of the unrotated signal point is supplied to the phase rotation circuit 24. Thereafter, the flow returns to step #16 to repeat the above operation by incrementing the parameter i by 1. That is, the phase of the unrotated signal point is rotated by a half of the immediately preceding rotational angle.

A practical example of the operation of this embodiment will be described below with reference to FIG. 4. Assume that the sample point of a digital complex baseband signal is a point A in FIG. 4. This sample point A is first rotated by 180° in a clockwise direction to move to a point B by the phase rotation circuit 24 (step #20).

As shown in step #14, the selector 13 selects the first latch circuit 21. In step #22, therefore, the phase of the complex baseband signal at the initial signal point A before the phase rotation held in the first latch circuit 21 is transferred to and held in the second latch circuit 22 via the selector 23, and the output phase-rotated signal point B from the phase rotation circuit 24 is newly held in the first latch circuit 21.

This phase-rotated signal point B is input to the comparator 26. The comparator 26 compares the phase of the input phase-rotated signal point B with the reference phase, 0°, stored in the fixed value storage circuit 27 (steps #26 and #30). The comparator 26 outputs a signal of level "1" if the phase of the signal point B leads the reference phase, a signal of level "−1" if the phase of the signal point B lags behind the reference phase, and a signal of level "0" if the two phases agree. As shown in FIG. 4, in this case the phase of the phase-rotated signal point B leads the reference phase. Accordingly, the comparator 26 outputs a signal of level "1". The control circuit 29 writes data "1" in the storage circuit 28 as in step #32.

When the first phase rotation control is completed and the data corresponding to the determination result is stored in the storage circuit 28, the control circuit 29 performs the second phase rotation control. On the basis of the determination result from the comparator 26, the control circuit 29 selects a signal point to be subjected to the phase rotation next. In this case the determination signal is a signal of level "1" which indicates that the phase of the phase-rotated signal point has not reached (leads) the reference point. Accordingly, the control circuit 29 determines that the phase rotational angle is still insufficient, and controls the selector 23 to select the first latch circuit 21 which holds the phase-rotated signal point B (step #34). Consequently, the phase of the phase-rotated signal point B held in the first latch circuit 21 is supplied to the phase rotation circuit 24 through the selector 23.

Thereafter, in step #18 the control circuit 29 performs address designation for the second time to the sin/cos data table 25. As a result, sin data and cos data corresponding to the second largest phase rotational angle, 90°, stored in address 2 are read out and supplied to the phase rotation circuit 24. The phase rotation circuit 24 rotates the phase of the signal B by 90°. The resulting phase-rotated signal point is a point C in FIG. 4.

Since the phase of this phase-rotated signal point C lags behind the reference phase (the phase is rotated too much), the comparator 26 outputs a signal of level "−1". As shown in step #36, the control circuit 29 writes data "0" in the storage circuit 28. In step #38, the control circuit 29 causes the selector 23 to select the second latch circuit 22. Selecting the second latch circuit 22 means that the next phase rotation processing is again performed for the current signal point before phase rotation. That is, in the third phase rotation processing, the signal point B before phase rotation held in the second latch circuit 22 is supplied to the phase rotation circuit 24 via the selector 23.

The control circuit 29 performs address designation for the third time to the sin/cos data table 25. Consequently, sin and cos data corresponding to a phase rotational angle of 45° stored in address 3 are read out from the sin/cos data table 25 and supplied to the phase rotation circuit 24. The phase rotation circuit 24 rotates the phase of the signal point B by 45°. This phase-rotated signal point is a point D in FIG. 4.

In step #22, in the same way as in the rotation processing for the first, second, and third times, the phase-rotated signal point D is fed back to and held in the first latch circuit 21, and the signal point B before phase rotation held in the second latch circuit 22 is again fed back and held via the selector 23.

When the phase-rotated signal point D is output, the comparator 26 compares the signal point D with a reference phase point F. Since the phase of the signal point D leads the phase of the reference phase point F, the comparator 26 outputs a determination signal of level "1", and data "1" is stored in the storage circuit 28.

When the third phase rotation control is completed and the data corresponding to the determination result is stored in the storage circuit 28, the control circuit 29 subsequently executes phase rotation control for the fourth time. That is, on the basis of the output determination signal of level "1" from the comparator 26, the control circuit 29 determines that the phase rotation in the third phase rotation control is still insufficient. Therefore, to select the phase-rotated signal point D, in step #34 the control circuit 29 controls the selector 23 to select the first latch circuit 21. Accordingly, the phase-rotated signal point D held in the first latch circuit 21 is supplied to the phase rotation circuit 24 through the selector 23.

The control circuit 29 then performs address designation for the fourth time to the sin/cos data table 25. Consequently, sin and cos data corresponding to a phase rotational angle of 22.5° are read out from the sin/cos data table 25 and supplied to the phase rotation circuit 24. The phase rotation circuit 24 rotates the phase of the signal point D by 22.5°. This phase-rotated signal point is a point E in FIG. 4. The phase-rotated signal point E is fed back to and held in the first latch circuit 21. Note that the signal point D before phase rotation which has been held in the first latch circuit 21 is transferred to and held in the second latch circuit 22.

When the phase-rotated signal point E is output, the comparator 26 compares the signal point E with the reference phase point F. Since the signal point E agrees with the reference phase point F, the comparator 26 outputs a signal of level "0". Accordingly, in step #28 data "1" is stored in the storage circuit 28, and the control circuit 29 terminates the operation by determining that the phase of the sample A of the digital complex baseband signal is detected.

If the rotated signal point does not agree with the reference phase point, the above operation is again repeated. However, when the rotation processing is performed for all the rotational angles stored in the sin/cos data table 25, the operation is ended as shown in step #24 regardless of whether the phase agreement is attained. If this is the case, an error of a minimum rotational angle of 1.4° or smaller is allowed.

When the operation is ended, the control circuit 29 reads out the data, "1011" in the case of FIG. 4, from the storage circuit 28, and supplies this value to a circuit (not shown) as phase detection data. Note that "1011" represents 11 in decimal notation and corresponds to $360° \times 11/16 = 247.5°$ when a phase of 0° to 360° is represented by four bits.

As described above, in this embodiment sin data and cos data representing rotational angles of 180°, 90°, 45°, ... are read out in decreasing order of angle from the sin/cos data table 25, and the phase rotation circuit 24 rotates the phase of a complex baseband signal. Thereafter, the comparator 26 compares the phase-rotated signal point with the reference phase point of phase 0°. On the basis of the determination result from the comparator 26, the selector 23 alternatively selects the signal point before or after the phase rotation and supplies the selected signal point to the phase rotation circuit 24 for the next phase rotation. This operation is repetitively performed until the comparator 26 determines that the phase-rotated signal point agrees with the reference phase point or until all the phase rotational angles are read out from the sin/cos data table 25.

Accordingly, the sin/cos data table 25 need only store sin data and cos data representing rotational angles of 180°, 90°, 45°, ... that are sequentially reduced by one-half, so the phase detection can be performed without using any large-capacity memory. Consequently, the circuit scale can be decreased compared to the case where an arc-tangent ROM is used. This makes it possible to decrease the size and weight of, e.g., a mobile radio communication apparatus.

Also, in this embodiment sin data and cos data representing rotational angles of 180°, 90°, 45°, ... are stored in the sin/cos data table 25. Therefore, these sin and cos data can be read out and directly used in the phase rotation calculation. As an example, if data representing angles are stored as phase rotational angles, a table for converting the angle data into sin data and cos data is necessary. However, in this embodiment no such table is necessary, and this further simplifies and miniaturizes the circuit configuration.

Furthermore, in this embodiment the phase rotation circuit 24 performs the phase rotation processing in decreasing order of phase rotational angle. Consequently, the complex baseband signal point can be approached to the reference phase point by a relatively small number of repetition times. This obviates the need for a large number of repetitive calculations, making phase detection within a short time period feasible. Also, the detection system is independent of the amplitude value of the complex baseband signal. Consequently, an accurate phase detection can be performed even in processing a signal, such as a received signal modulated by a π/4 shift DQPSK system, which changes its amplitude level in accordance with the phase position.

Other embodiments of the phase detection apparatus according to the present invention will be described below. In the following explanation of the other embodiments, the same reference numerals as in the first embodiment denote the same parts, and a detailed description thereof will be omitted.

Figures 5, 6:
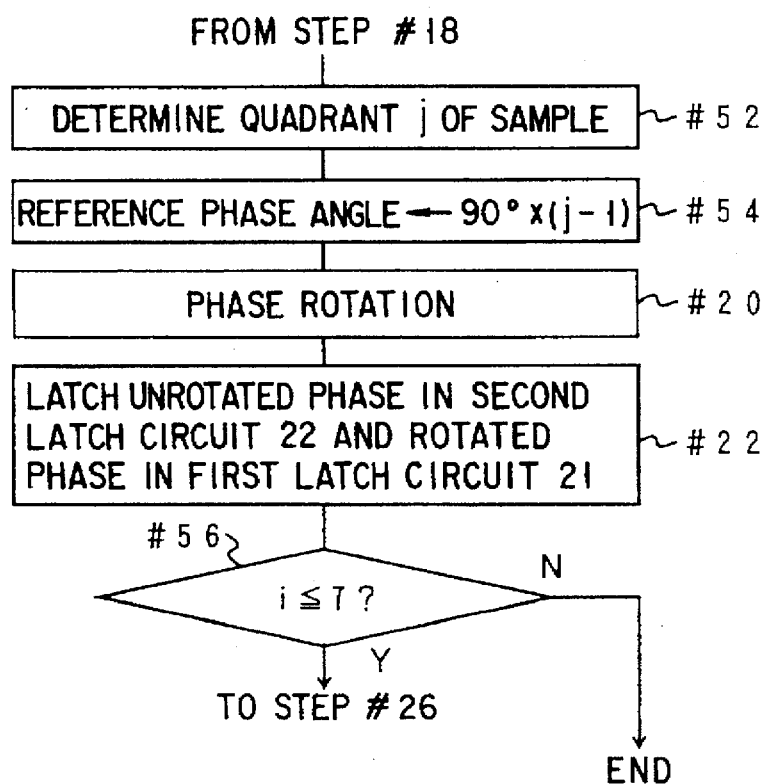
FIG. 5 is a view showing an example of a sin/cos data table used in a phase detection apparatus according to the second embodiment of the present invention.
FIG. 6 is a flow chart showing the major steps of the operation of the second embodiment.

In the first embodiment the reference phase of the comparator 26 is fixed to 0°. In the second embodiment, the reference phase is variable and is set in accordance with the position of the signal point of an input sample. This allows a phase angle detection with a smaller number of phase rotational angles than in the first embodiment. The configuration of the second embodiment is the same as the block diagram, FIG. 1, of the first embodiment except that output sample data from a quadrature detection circuit 13 is also supplied to a control circuit 29 and the control circuit 29 supplies the reference phase to the comparator 26 although the fixed value storage circuit 27 is omitted. Therefore, the configuration of the second embodiment is omitted from the drawings. Note that as shown in FIG. 5, data in a sin/cos data table 25 is slightly different from that in the first embodiment. That is, sin data and cos data representing a rotational angle of $180°/2^n$ (n=1 to 7), i.e., seven rotational angles of 90°, 45°, 22.5°, 11.3°, 5.6°, 2.8°, and 1.4°, are stored in a one-to-one correspondence with addresses 1 to 7.

Figure 3:
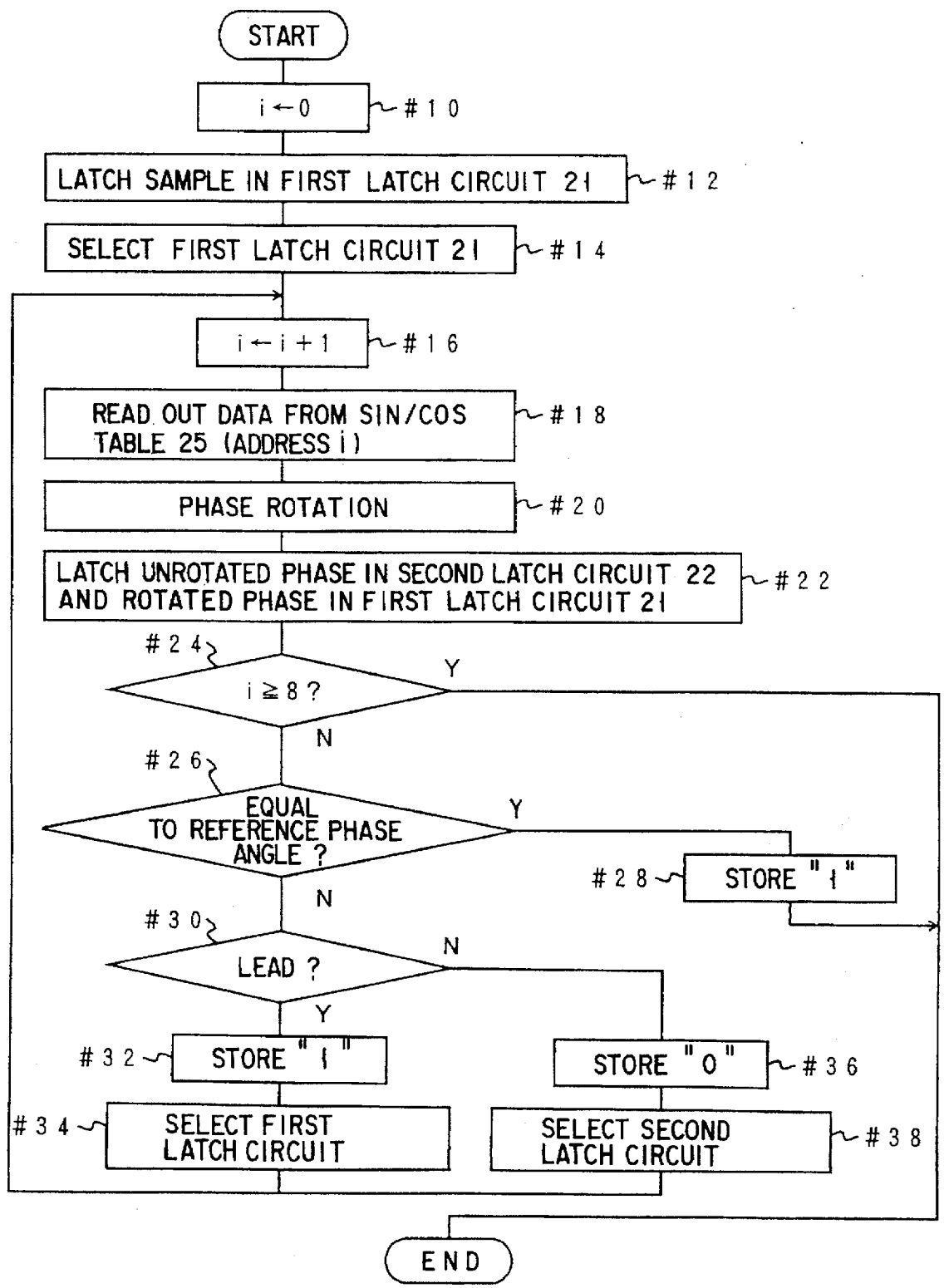
FIG. 3 is a flow chart showing the operation of the first embodiment.

FIG. 6 is a flow chart showing the operation of the second embodiment, in which the same steps as in FIG. 3 are not shown.

Figure 7:
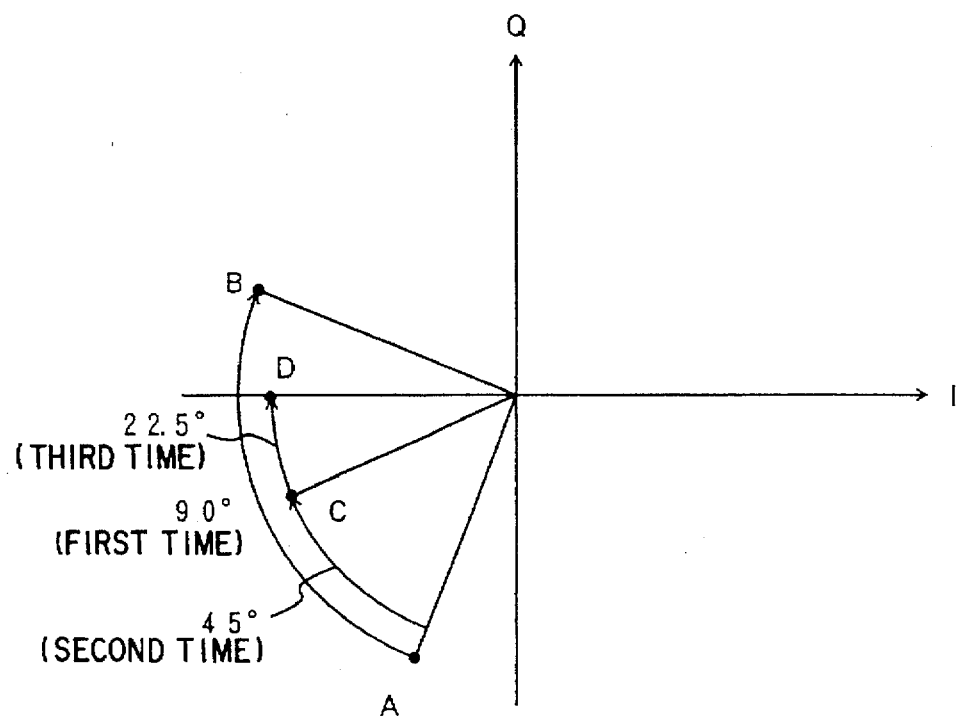
FIG. 7 is a view showing the way of phase rotation to explain the operation of the second embodiment.

The second embodiment is identical with the first embodiment from step #10 to step #18 in FIG. 3. In the second embodiment, after step #18 steps #52 and #54 are executed and then phase rotation processing in step #20 is executed. In step #52, the control circuit 29 determines the quadrant in which an input sample point A is located. This determination can be readily accomplished using the combination of the signs of I and Q components. As illustrated in FIG. 7, in this embodiment both the I and Q components of the sample point A are negative, so the control circuit 29 can determine that the sample point A exists in the third quadrant. In step #54, the control circuit 29 sets 90°×(j−1), where j is the quadrant, as the reference phase of the comparator 26. In the case of the third quadrant, 180° is set as the reference angle.

Thereafter, as in the first embodiment, the phase rotation processing is performed in step #20, and in step #22 the signal points before and after the phase rotation are latched by second and first latch circuits 22 and 21, respectively. In step #54, the control circuit 29 determines whether a parameter i has reached 7. The subsequent operation is identical with that in the first embodiment.

The operation of the second embodiment will be described in more detail below with reference to FIG. 7. Since the sample point of a digital complex baseband signal is the point A in the third quadrant, the reference angle is 180°. The sample point A is first rotated by 90° in a clockwise direction to move to a point B by the phase rotation circuit 24. Since the phase of the point B lags behind (the phase is rotated too much) the reference phase point (180°), the control circuit writes data "0" in a storage circuit 28.

Phase rotation processing for the second time is performed for the signal point A before the current phase rotation. The phase rotation circuit 24 rotates the phase of the signal point A by 45°. The phase-rotated signal point is a point C in FIG. 7. Since the phase of the signal point C leads the reference phase angle 180°, data "1" is stored in the storage circuit 28.

The signal point C leads the reference phase point, and so the phase rotation processing for the third time is performed for the signal point C. The signal point C is rotated by 22.5° in a clockwise direction. Assume the rotated signal point C agrees with the reference point (180°). In this case data "1" is stored in the storage circuit 28.

Thereafter, the control circuit 29 reads out data "011" from the storage circuit 28 and supplies 247.5°, which is the sum of a phase (67.5°) represented by the readout data and the reference phase (180°), to a circuit (not shown) as phase detection data.

When the operation is completed, the control circuit 29 reads out the data "011" stored in the storage circuit 28 and supplies data, which is the sum of a phase represented by the readout data and the reference phase, to a circuit (not shown) as phase detection data. Note that "011" represents 3 in decimal notation and corresponds to $180° \times 3/8 = 67.5°$ when a phase of 0 to 180° is represented by three bits. Accordingly, the control circuit 29 detects that the phase of the sample A is 247.5°.

In addition to achieving the same effect as in the first embodiment, the second embodiment can perform phase detection by rotating the phase only three times, which is one less than four times in the first embodiment. This results in a shorter detection time than in the first embodiment.

Figure 8:
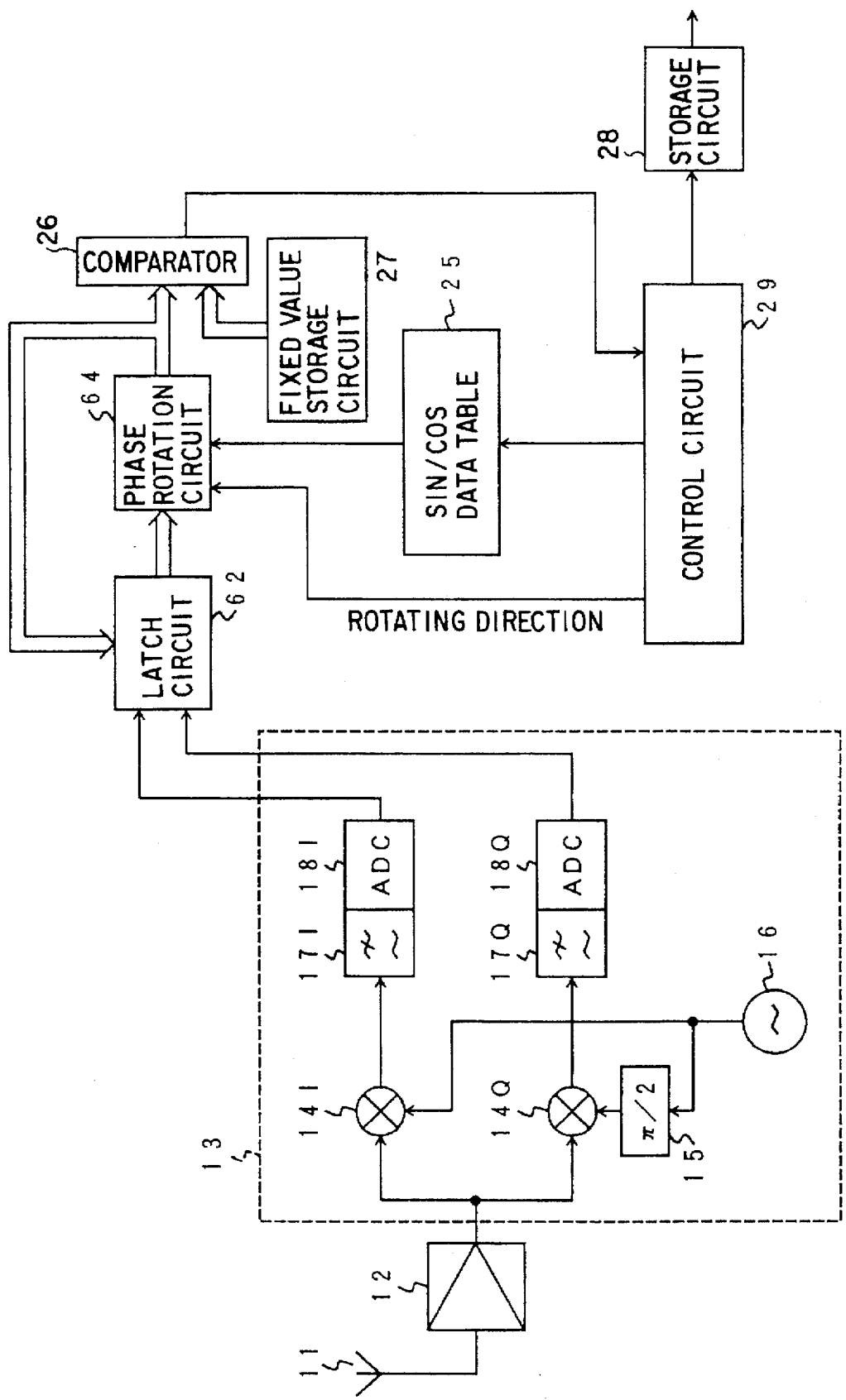
FIG. 8 is a block diagram showing the configuration of a receiving system of a mobile radio communication apparatus which includes a phase detection apparatus according to the third embodiment of the present invention.

FIG. 8 is a block diagram of the third embodiment. In each of the above embodiments, the phase rotating direction is fixed. Therefore, if the phase is rotated too much, a signal point before the rotation is again rotated; if the rotation is insufficient, the rotated signal point is further rotated. Accordingly, two latch circuits are necessary to hold the signal points before and after the rotation. In this third embodiment two latch circuits are unnecessary because the rotating direction is selectable. That is, an output from a quadrature detection circuit 13 is supplied to a phase rotation circuit 64 via a latch circuit 62. An output from the phase rotation circuit 64 is fed back to the latch circuit 62. Although a reference phase of a comparator 26 can be either fixed or variable, in this embodiment the reference phase is fixed as in the first embodiment. Accordingly, the contents of a sin/cos data table 25 are the same as those shown in FIG. 2. A control circuit 29 controls the rotating direction of the phase rotation circuit 64 in accordance with the comparison result from the comparator 26.

Figure 9:
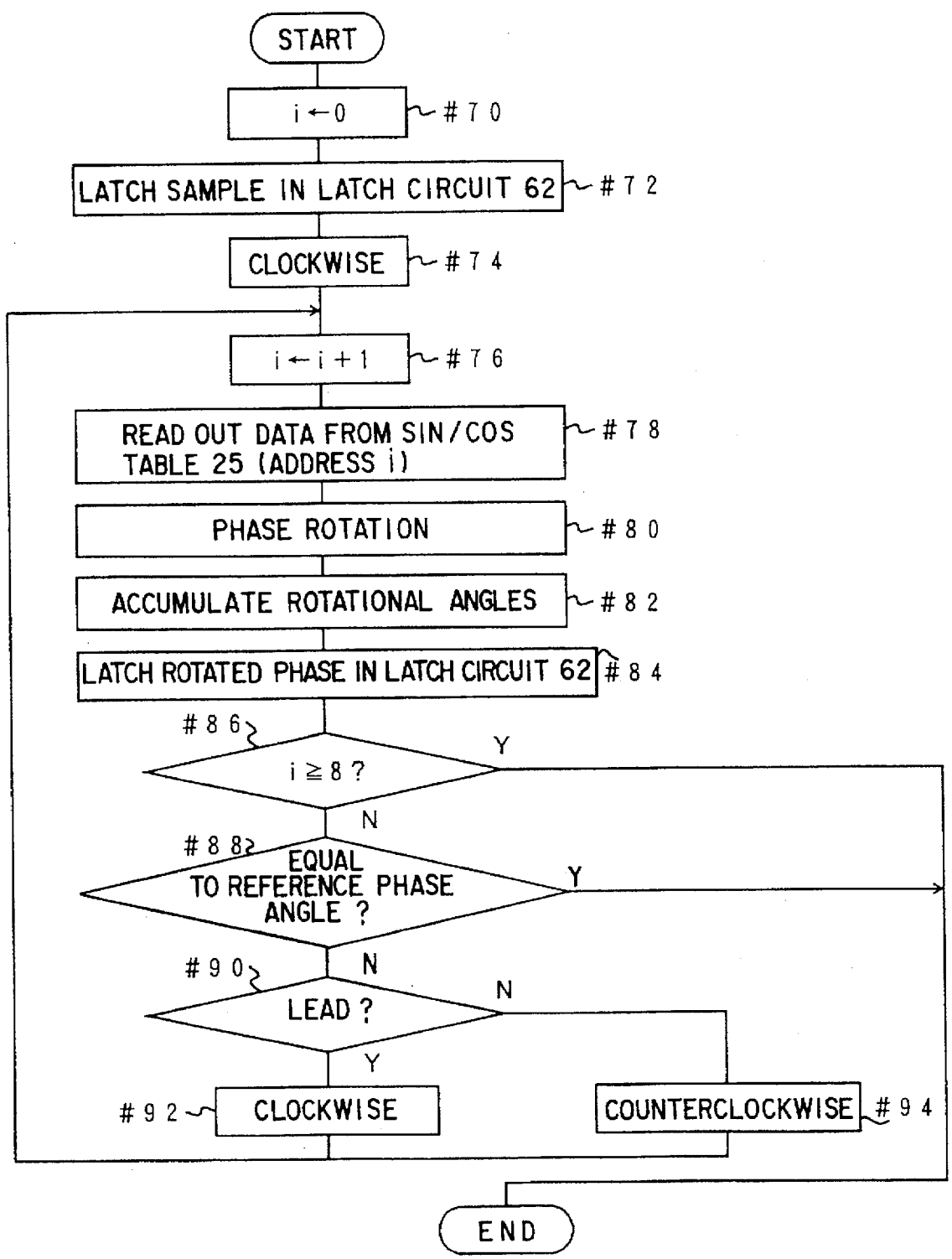
FIG. 9 is a flow chart showing the operation of the third embodiment.

The operation of the third embodiment will be described below with reference to FIG. 9.

When the operation is started, the control circuit 29 performs initialization as shown in step #70, i.e., sets 0 in a parameter i which represents the number of rotations.

When A/D converters 18I and 18Q output digital complex baseband signals of one sample, the data of one sample is latched by the latch circuit 62 in step #72.

In step #74, the control circuit 29 sets the phase rotating direction in the clockwise direction.

In step #76, the control circuit 29 increments the parameter i by 1.

In step #78, the control circuit 29 supplies the parameter i as an address to the sin/cos data table 25, reads out sin data and cos data stored in that address, and supplies the readout data to the phase rotation circuit 64. That is, the control circuit 29 first designates address 1 and reads out sin data and cos data corresponding to the largest phase rotational angle, i.e., 180°.

Assuming an input to the phase rotation circuit 64 is I+jQ, a signal I'+jQ' after the rotation is represented as follows in accordance with the rotating direction. In the case of the clockwise direction:

I'=I·cos θ−Q·sin θ

Q'=Q·cos θ+I·sin θ

In the case of the counterclockwise direction:

I'=I·cos θ+Q·sin θ

Q'=Q·cos θ−I·sin θ

In step #80, the phase rotation circuit 64 performs a phase shift operation by which the sample point of the digital complex baseband signal held in the latch circuit 62 is rotated clockwise.

In step #82, the control circuit 29 accumulates the rotational angles.

In step #84, the control circuit 29 causes the latch circuit 62 to latch the rotated sample point.

In step #86, the control circuit 29 determines whether the parameter i has reached 8. If YES in step #86, the control circuit 29 terminates the operation because the phase rotation circuit 64 has completed the rotation processing for all of the rotational angles stored in the sin/cos data table 25. If NO in step #86, in step #88 the comparator 26 determines whether the rotated signal point agrees with a reference point having the reference phase stored in a fixed value storage circuit 27. If YES in step #88, the control circuit 29 ends the operation.

If NO in step #88, in the step #90 the control circuit 29 determines whether the rotated signal point leads the reference phase point. If YES in step #90, in step #92 the control circuit 29 sets the rotating direction in the clockwise direction, and the flow returns to step #76 to repeat the above operation by incrementing the parameter i by 1. That is, the rotated signal point is further rotated clockwise by one-half of the immediately preceding rotational angle. If NO in step #90, in step #94 the control circuit 29 sets the rotating direction in the counterclockwise direction, and the flow returns to step #76 to repeat the above operation by incrementing the parameter i by 1. That is, the rotated signal point is rotated counterclockwise by one-half of the immediately preceding rotational angle. Note that if the rotating direction is the counterclockwise direction, the rotational angles assigned with negative sign are accumulated; i.e., the rotational angles are subtractively accumulated.

Figure 10:
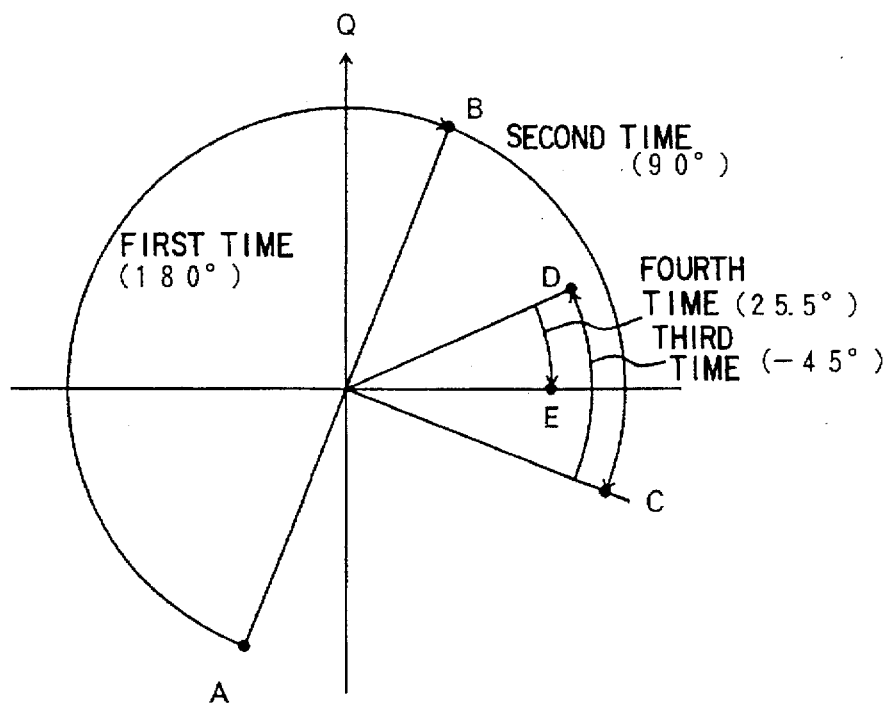
FIG. 10 is a view showing the way of phase rotation to explain the operation of the third embodiment.

A practical example of the operation of this embodiment will be described below with reference to FIG. 10. Assume, for example, that the sample point of the digital complex baseband signal is a point A in FIG. 10. The sample point A is first rotated by 180° in a clockwise direction to move to a point B by the phase rotation circuit 64 (step #80). Accordingly, 180° is set as an initial value of the accumulated angle.

The comparator 26 compares this phase-rotated signal point B with a reference point of phase 0° which is stored in the fixed value storage circuit 27 (steps #86 and #88).

Since the phase still leads the reference phase after the first phase rotation, the second phase rotation is performed clockwise. Consequently, the phase of the signal point B is rotated by 90° in a clockwise direction. The resulting phase-rotated signal point is a point C. At this time the accumulated value of the rotational angles is 270°.

The phase-rotated signal point C lags behind the reference phase point (the phase is rotated too much). Therefore, in step #94 the rotating direction is set in the counterclockwise direction and the third phase rotation is performed. The signal point C is rotated by 45° in a counterclockwise direction. The consequent accumulated value of the rotational angles is 225°.

Since the phase-rotated signal point D leads the reference phase point, the fourth rotation is performed clockwise. The signal point D is rotated by 22.5° in a clockwise direction to become a signal point E. The rotational angle accumulated value is 247.5°.

Since the signal point E agrees with the reference phase point, the control circuit 29 determines that the phase of the sample point A is detected, and ends the operation. After terminating the operation, the control circuit 29 supplies the rotational angle accumulated value (in this example 247.5°) to a circuit (not shown) as phase detection data.

As described above, in addition to achieving the same effects as in the first and second embodiments, the third embodiment further achieves the following effects. That is, each subsequent phase rotating direction is determined in accordance with whether the rotated signal point lags behind or leads the reference phase point. Also, the accumulated value of rotational angles until the rotated signal point agrees with the reference phase point is detected as the phase of the sample point. Accordingly, unlike in the first and second embodiments it is unnecessary to provide two latch circuits and a selector for selecting them. This further miniaturizes the circuit configuration. Additionally, the processing can be executed in short time periods because processing for selecting one of two latch circuits also is unnecessary.

The present invention is not limited to the above embodiments but can be practiced in the form of various modifications. For example, in the above embodiments the phase rotational angle is sequentially reduced by one-half. However, the phase rotational angle need not be reduced by one-half but can be reduced by, e.g., ⅓. Also, the practical values of the rotational angle are merely examples, so angles smaller than 1.4° can be set in the table 25 in order to further improve the accuracy. Although the clockwise direction is used as the basic direction of the phase rotating direction, rotation can be done counterclockwise in the first embodiment. In this case the selector 23 needs to select the opposite one of the first and second latch circuits to the one selected in the first embodiment, in accordance with whether the phase of a signal point leads or lags behind the reference phase. Furthermore, the reference phase point is fixed in the third embodiment, but it is also possible to set the reference phase point in accordance with the position of the sample point as in the second embodiment. Also, the rotated signal point is compared with the reference phase point, and, if the two points do not agree, the rotated signal point is again rotated by decreasing the rotational angle. However, if the two points do not agree, the signal point before the rotation can be again rotated by changing the rotational angle, without using the latch for holding the rotated signal point. Additionally, the circuit configuration and the control procedure of the phase detection apparatus and the contents of the control also can be modified without departing from the gist of the present invention. That is, the above embodiments have been described by taking a phase detection apparatus using a combination of hardware circuits as an example. However, these embodiments can also be constituted such that phase detection is performed using software by phase rotation control by using a program logic device such as a digital signal processor (DSP). With the use of the DSP it is possible to perform phase detection by a relatively short process procedure and calculation. Accordingly, phase detection can be accomplished without using any large-scale phase detection apparatus within relatively short time periods.

Industrial Applicability

As has been described in detail above, the phase detection apparatus of the present invention comprises phase rotating means for rotating the phase of an input signal point by a predetermined angle, rotational angle setting means for supplying a plurality of rotational angles in decreasing order to the phase rotating means, phase comparing means for determining whether the signal point rotated by the phase rotating means agrees with a reference phase point within a predetermined error range, control means for sequentially rotating the phase of the input signal point by plurality of the rotational angles until the phase comparing means detects the agreement, or, even if the phase comparing means does not detect the agreement, until the rotational angle setting means supplies all of the rotational angles to the phase rotating means, and phase detecting means for detecting the phase of the input signal point from a sum of the phase rotational angles from the phase rotating means.

According to the phase detection apparatus of the present invention, therefore, phase detection can be performed without using any large-capacity memory, so the circuit scale can be decreased compared to the case where an arc-tangent ROM is used. Consequently, it is possible to decrease the size and weight of, e.g., a mobile radio communication apparatus.

Also, since the phase rotation is done in decreasing order of angle, the phase of an input signal can be made agree with the reference phase by a relatively small number of repetition times. This obviates the need for a large number of repetitive calculations, making phase detection within a short time feasible.

Furthermore, the detection system is independent of the amplitude value of an input signal. Accordingly, an accurate phase detection can be performed even in processing a signal, such as a received signal modulated by a π/4 shift DQPSK system, which changes its amplitude level in accordance with the phase position.

I claim:

1. A phase detection apparatus comprising:

phase rotating means for rotating phases of signal points including a sample signal point;

rotational angle setting means for supplying a plurality of rotational angles in decreasing order to said phase rotating means;

phase comparing means for determining whether the phases of the signal points rotated by said phase rotating means agree with a reference phase point within a predetermined error range;

control means for selectively supplying to said phase rotating means one of signal points before and after an immediately preceding phase rotation to cause said phase rotating means to perform the phase rotation processing by the rotational angle set by said rotational angle setting means, until said phase comparing means detects the agreement, or, even if said phase comparing means does not detect the agreement, until said rotational angle setting means supplies all of the rotational angles to said phase rotating means, and for outputting data indicating the phase of the sample signal point based on a sum of the phase rotational angles.

2. A phase detection apparatus according to claim 1, wherein said rotational angle setting means comprises a table for storing sine values and cosine values of the rotational angles.

3. A phase detection apparatus according to claim 1, wherein said rotational angle setting means supplies to said phase rotating means a rotational angle of $360°/2^n$ (n=1, 2, ...), if the reference phase point is 0°.

4. A phase detection apparatus according to claim 1, wherein said phase rotating means comprises means for rotating the phases of the signal points in a clockwise direction, and said control means supplies the rotated signal point to said phase rotating means if the phase of the rotated signal point leads the reference phase point in the counterclockwise direction, and supplies the unrotated signal point to said phase rotating means if the phase of the rotated signal point lags behind the reference phase point in the counterclockwise direction.

5. A phase detection apparatus according to claim 1, wherein said phase rotating means comprises means for rotating the phases of the signal points in a counterclockwise direction, and said control means supplies the unrotated signal point to said phase rotating means if the phase of the rotated signal point leads the reference phase point in the counterclockwise direction, and supplies the rotated signal point to said phase rotating means if the phase of the rotated signal point lags behind the reference phase point in the counterclockwise direction.

6. A phase detection apparatus comprising:

phase rotating means for rotating phases of signal points including a sample signal point;

phase comparing means for determining whether the phases of the signal points rotated by said phase rotating means agree with a predetermined phase point; and control means for adjusting the rotational angle of said phase rotating means in accordance with the determination result by said phase comparing means so that said phase comparing means detects the agreement, and for outputting data indicating the phase of the sample signal point on the basis of the rotational angle of said phase rotating means, wherein said control means comprises setting means for sequentially setting rotational angles which decrease step by step in said phase rotating means, and said phase rotating means comprises holding means for holding a rotated signal point, and means for rotating the rotated signal point, held by said holding means, by the rotational angle set by said setting means.

7. A phase detection apparatus according to claim 6, wherein said control means comprises a table for storing sine values and cosine values of the rotational angles.

8. A phase detection apparatus according to claim 7, wherein said control means comprises a table for storing sine values and cosine values of a rotational angle of $360°/2^n$ (n=1, 2, ...), if the predetermined phase point is 0°.

9. A phase detection apparatus comprising:

phase rotating means for rotating phases of signal points including a sample signal point;

phase comparing means for determining whether the phases of the signal points rotated by said phase rotating means agree with a predetermined phase point; and control means for adjusting the rotational angle of said phase rotating means in accordance with the determination result by said phase comparing means so that said phase comparing means detects the agreement, and for outputting data indicating the phase of the sample signal point on the basis of the rotational angle of said phase rotating mean, wherein said control means comprises setting means for sequentially setting rotational angles which decrease step by step in said phase rotating means, and said phase rotating means comprises first holding means for holding a rotated signal point, second holding means for holding an unrotated signal point, and means for rotating the signal point held in one of said first and second holding means in a predetermined direction by the rotational angle set by said setting means, in accordance with whether the phase of the rotated signal point leads or lags behind the predetermined phase point.

10. A phase detection apparatus according to claim 9, wherein said control means comprises a table for storing sine values and cosine values of the rotational angles.

11. A phase detection apparatus according to claim 10, wherein said control means comprises a table for storing sine values and cosine values of a rotational angle of $360°/2^n$ (n=1, 2, ... ), if the predetermined phase point is 0°.

12. A phase detection apparatus comprising:

phase rotating means for rotating phases of signal points including a sample signal point;

phase comparing means for determining whether the phases of the signal points rotated by said phase rotating means agree with a predetermined phase point; and control means for adjusting the rotational angle of said phase rotating means in accordance with the determination result by said phase comparing means so that said phase comparing means detects the agreement, and for outputting data indicating the phase of the sample signal point on the basis of the rotational angle of said phase rotating means, wherein said control means comprises setting means for sequentially setting rotational angles which decrease step by step in said phase rotating means, and said phase rotating means comprises holding means for holding a rotated signal point, and means for rotating the signal point held in said holding means in a predetermined direction by the rotational angle set by said setting means, in accordance with whether the phase of the rotated signal point leads or lags behind the predetermined phase point.

13. A phase detection apparatus according to claim 12, wherein said control means comprises a table for storing sine values and cosine values of the rotational angles.

14. A phase detection apparatus according to claim 13, wherein said control means comprises a table for storing sine values and cosine values of a rotational angle of $360°/2^n$ (n=1, 2, ... ), if the predetermined phase point is 0°.

15. A phase detection apparatus comprising:

phase rotating means for rotating phases of signal points including a sample signal point;

phase comparing means for determining whether the phases of the signal points rotated by said phase rotating means agree with a predetermined phase point; and control means for adjusting the rotational angle of said phase rotating means in accordance with the determination result by said phase comparing means so that said phase comparing means detects the agreement, and for outputting data indicating the phase of the sample signal point on the basis of the rotational angle of said phase rotating means, wherein said phase rotating means comprises means for rotating the phases of the signal points in a clockwise direction, and said control means supplies a rotated signal point to said phase rotating means if the phase of the rotated signal point leads the predetermined phase point in the counterclockwise direction, and supplies an unrotated signal point to said phase rotating means if the phase of the rotated signal point lags behind the predetermined phase point in the counterclockwise direction.

16. A phase detection apparatus comprising:

phase rotating means for rotating phases of signal points including a sample signal point;

phase comparing means for determining whether the phases of the signal points rotated by said phase rotating means agree with a predetermined phase point; and control means for adjusting the rotational angle of said phase rotating means in accordance with the determination result by said phase comparing means so that said phase comparing means detects the agreement, and for outputting data indicating the phase of the sample signal point on the basis of the rotational angle of said phase rotating means, wherein said phase rotating means comprises means comprises means for rotating the phases of the signal points in a clockwise direction, and said control means supplies an unrotated signal point to said phase rotating means if the phase of a rotated signal point leads the predetermined phase point in the counterclockwise direction, and supplies the rotated signal point to said phase rotating means if the phase of the rotated signal point lags behind the predetermined phase point in the counterclockwise direction.

17. A phase detection apparatus comprising:

determining means for determining a quadrant in a complex plane in which a sample signal point is located;

phase rotating means for rotating phases of signal points including the sample signal point;

phase comparing means for determining whether the phases of the signal points rotated by said phase rotating means agree with a predetermined phase point set in accordance with the quadrant determined by said determining means; and control means for adjusting the rotational angle of said phase rotating means in accordance with the determination result from said phase comparing means so that said phase comparing means detects the agreement, and for outputting data indicating the phase of the sample signal point on the basis of the rotational angle of said phase rotating means and the predetermined phase point.

18. A phase detection apparatus according to claim 17, wherein said control means comprises setting means for sequentially setting rotational angles which decrease step by step in said phase rotating means, and said phase rotating means comprises holding means for holding a rotated signal point, and means for rotating the rotated signal point, held by said holding means, by the rotational angle set by said setting means.

19. A phase detection apparatus according to claim 18, wherein said control means comprises a table for storing sine values and cosine values of the rotational angles.

20. A phase detection apparatus according to claim 19, wherein said control means comprises a table for storing sine values and cosine values of a rotational angle of $360°/2^n$ (n=1, 2, ... ), if the predetermined phase point is 0°.

21. A phase detection apparatus according to claim 17, wherein said control means comprises setting means for sequentially setting rotational angles which decrease step by step in said phase rotating means, and said phase rotating means comprises first holding means for holding a rotated signal point, second holding means for holding an unrotated signal point, and means for rotating the signal point held in one of said first and second holding means in a predetermined direction by the rotational angle set by said setting means, in accordance with whether the rotated signal point leads or lags behind the predetermined phase point.

22. A phase detection apparatus according to claim 21, wherein said control means comprises a table for storing sine values and cosine values of the rotational angles.

23. A phase detection apparatus according to claim 22, wherein said control means comprises a table for storing sine values and cosine values of a rotational angle of $360°/2^n$ (n=1, 2, ...), if the predetermined phase point is 0°.

24. A phase detection apparatus according to claim 17, wherein
said means comprises setting means for sequentially setting rotational angles which decrease step by step in said phase rotating means, and
said phase rotating means comprises holding means for holding a rotated signal point, and means for rotating the signal point held in said holding means in a predetermined direction by the rotational angle set by said setting means, in accordance with whether the rotated signal point leads or lags behind the predetermined phase point.

25. A phase detection apparatus according to claim 24, wherein said control means comprises a table for storing sine values and cosine values of the rotational angles.

26. A phase detection apparatus according to claim 25, wherein said control means comprises a table for storing sine values and cosine values of a rotational angle of $360°/2^n$ (n=1, 2, ...), if the predetermined phase point is 0°.

27. A phase detection apparatus according to claim 17, wherein
said phase rotating means comprises means for rotating the phases of the signal points in a clockwise direction, and
said control means supplies a rotated signal point to said phase rotating means if the phase of the rotated signal point leads the predetermined phase point in the counterclockwise direction, and supplies an unrotated signal point to said phase rotating means if the phase of the rotated signal point lags behind the predetermined phase point in the counterclockwise direction.

28. A phase detection apparatus according to claim 17, wherein
said phase rotating means comprises means for rotating the phases of the signal points in a counterclockwise direction, and
said control means supplies an unrotated signal point to said phase rotating means if the phase of the rotated signal point leads the predetermined phase point in the counterclockwise direction, and supplies a rotated signal point to said phase rotating means if the phase of the rotated signal point lags behind the predetermined phase point in the counterclockwise direction.

29. A phase detector comprising:
a table containing rotational angle data for a plurality of rotational angles;
a phase rotator; and
a controller which is configured to determine phase by using the rotational angle data to control said phase rotator such that the respective phases of signals supplied to said phase rotator are rotated relative to a reference phase, wherein said controller uses the rotational angle data to define a series of rotating processes by said phase rotator, each rotating process corresponding to one of the plurality of rotational angles;
a first storage location for storing phase data corresponding to the phase of one of said signals after a respective rotating process;
a second storage location for storing phase angle data corresponding to the phase of said one of said signals before the respective rotating process; and
a selector responsive to a selecting signal from said controller to select an output of one of said first and second storage locations for supplying the selected output to said phase rotator for a rotating process which follows the respective rotating process.

30. A phase detector according to claim 29, wherein each successive rotating process in the series corresponds to a smaller rotational angle than a preceding rotating process in the series.

31. A phase detector according to claim 29, wherein
said phase rotator rotates the respective phases of said signals in a clockwise direction,
the selecting signal selects the output of said first storage location if the phase of said one of said signals after the respective rotating operation leads the reference phase in a counterclockwise direction, and
the selecting signal selects the output of said second storage location if the phase of said one of said signals after the respective rotating operation lags the reference phase in the counterclockwise direction.

32. A phase detector according to claim 29, wherein
said phase rotator rotates the respective phases of said signals in a counterclockwise direction,
the selecting signal selects the output of said second storage location if the phase of said one of said signals after the respective rotating operation leads the reference phase in a counterclockwise direction, and
the selecting signal selects the output of said first storage location if the phase of said one of said signals after the respective rotating operation lags the reference phase in the counterclockwise direction.

33. A phase detector according to claim 29, wherein the selecting signal selects the output of one of said first and second storage locations based on whether the phase angle of said one of said signals leads or lags the reference phase after the respective rotating operation.

34. A phase detector according to claim 29, wherein the reference phase is a constant reference phase.

35. A phase detector according to claim 34, further comprising:
a storage location for storing the constant reference phase.

36. A phase detector according to claim 29, wherein the reference phase is a variable reference phase.

37. A phase detector according to claim 36, wherein the variable reference phase is determined in accordance with a quadrant in a complex plane in which one of said signals is located.

38. A phase detector according to claim 29, wherein the rotational angle data comprises sine and cosine data for the plurality of rotational angles.

39. A phase detector according to claim 29, wherein said controller controls said phase rotator such that the respective phases of said signals are rotated until the phase of one of said signals is rotated to within a predetermined range around the reference phase or until all of the rotational angles in said table have been used.

40. A phase detector according to claim 39, further comprising:
a comparator for comparing the phase of the signals rotated by said phase detector and the reference phase.

41. A phase detector according to claim 29, wherein said phase rotator rotates the respective phases of said signals in only one of a clockwise and a counterclockwise direction.

42. A phase detector according to claim 29, wherein said phase rotator is responsive to a rotation control signal from said controller for rotating the respective phases of said signals in either one of a clockwise and a counterclockwise direction.

43. A phase detector according to claim 29, wherein said controller determines phase based on an amount of rotation of said signals by said phase rotator.

* * * * *